(12) United States Patent
Onishi et al.

(10) Patent No.: US 11,404,900 B2
(45) Date of Patent: Aug. 2, 2022

(54) POWER SUPPLY DEVICE AND METHOD FOR PROVIDING POWER SUPPLY DEVICE

(71) Applicants: JTEKT CORPORATION, Osaka (JP); KYOHO MACHINE WORKS, LTD., Toyota (JP)

(72) Inventors: Takanori Onishi, Fujisawa (JP); Koji Nishi, Anjo (JP); Shinichi Sawada, Nagoya (JP); Toyoki Sugiyama, Kitakatsuragi-gun (JP); Takumi Mio, Kariya (JP); Yukihiro Komatsubara, Chiryu (JP); Satoshi Shinoda, Neyagawa (JP); Masafumi Kawano, Toyota (JP)

(73) Assignees: JTEKT CORPORATION, Kariya (JP); KYOHO MACHINE WORKS, LTD., Toyota (JP)

( * ) Notice: Subject to any disclaimer, the term of this patent is extended or adjusted under 35 U.S.C. 154(b) by 277 days.

(21) Appl. No.: 16/794,342

(22) Filed: Feb. 19, 2020

(65) Prior Publication Data

US 2020/0266656 A1 Aug. 20, 2020

(30) Foreign Application Priority Data

Feb. 19, 2019 (JP) .............................. JP2019-027813

(51) Int. Cl.
*H02J 9/00* (2006.01)
*H02J 9/06* (2006.01)

(52) U.S. Cl.
CPC .............. *H02J 9/005* (2013.01); *H02J 9/061* (2013.01); *H02J 9/062* (2013.01)

(58) Field of Classification Search
CPC ....... H01M 10/425; H01M 2010/4271; H01M 2010/4278; H01M 2220/10;
(Continued)

(56) References Cited

U.S. PATENT DOCUMENTS

| 2008/0090137 A1 | 4/2008 | Buck et al. |
| 2008/0193830 A1 | 8/2008 | Buck et al. |

(Continued)

FOREIGN PATENT DOCUMENTS

| JP | 2008-062712 A | 3/2008 |
| JP | 2011-243449 A | 12/2011 |
| KR | 20-0473025 Y1 | 6/2014 |

OTHER PUBLICATIONS

Jul. 14, 2020 Extended Search Report issued in European Patent Application No. 20157856.4.

*Primary Examiner* — Terrell S Johnson
(74) *Attorney, Agent, or Firm* — Oliff PLC

(57) ABSTRACT

A power supply device includes a combination of one power supply module of a plurality of power supply modules having different power supply performances and one controller of a plurality of controllers having different functions, which are selectively combined. Each of the plurality of power supply modules includes a power supply module side connection portion common to the plurality of power supply modules, and each of the plurality of controllers includes a controller side connection portion common to the plurality of controllers and connectable to the power supply module side connection portion, to allow the one power supply module and the one controller are selectively combined.

6 Claims, 6 Drawing Sheets

(58) Field of Classification Search
CPC ........ H01M 2220/20; H02J 7/34; H02J 7/345;
H02J 9/005; H02J 9/06; H02J 9/061;
H02J 9/062; Y02E 60/10
See application file for complete search history.

(56) References Cited

U.S. PATENT DOCUMENTS

| | | |
|---|---|---|
| 2009/0214941 A1 | 8/2009 | Buck et al. |
| 2014/0316651 A1* | 10/2014 | Cho .......................... B60L 1/02 |
| | | 701/36 |
| 2017/0070074 A1 | 3/2017 | Sugeno et al. |
| 2018/0243662 A1* | 8/2018 | Bushell .................. A63H 37/00 |
| 2019/0052119 A1* | 2/2019 | Hendrix ................ H02J 7/0048 |

* cited by examiner

POWER SUPPLY DEVICE AND METHOD FOR PROVIDING POWER SUPPLY DEVICE

CROSS-REFERENCES TO RELATED APPLICATIONS

This application is based upon and claims the benefit of priority from Japanese Patent Application No. 2019-027813, filed on Feb. 19, 2019, the entire contents of which are incorporated herein by reference.

FIELD

One or more embodiments of the present invention relate to a power supply device and a method for providing the power supply device.

BACKGROUND

As seen in JP-A-2008-62712, a power supply device including an electric double-layer capacitor and a secondary battery has been proposed. Such a power supply device includes a controller having a function of switching charging and discharge states while being used to back up a power supply when a main power supply fails, for example.

SUMMARY

In the power supply device, a power supply performance and a function of the controller are different depending on uses. In recent years, power supply devices are required for a wide variety of uses. If a power supply device is to be provided for each use, the power supply device must be redesigned for each use, which may increase the number of steps required to provide the power supply device.

An object of one or more embodiments of the present invention is to prevent the number of steps required to provide the power supply device from increasing.

An aspect of the present invention provides a power supply device including: a combination of one power supply module of a plurality of power supply modules having different power supply performances and one controller of a plurality of controllers having different functions, which are selectively combined, wherein each of the plurality of power supply modules includes a power supply module side connection portion common to the plurality of power supply modules, and each of the plurality of controllers includes a controller side connection portion common to the plurality of controllers and connectable to the power supply module side connection portion, to allow the one power supply module and the one controller are selectively combined.

Another aspect of the present invention provides a method for providing a power supply device including a combination of one power supply module of a plurality of power supply modules having different power supply performances and one controller of a plurality of controllers having different functions, which are selectively combined, the method for providing the power supply device including: a power supply module selection process in which the one power supply module is selected from the plurality of power supply modules having the different power supply performances, each of the plurality of power supply modules including a power supply module side connection portion common to the plurality of power supply modules; and a controller selection process in which the one controller is selected from the plurality of controllers having different functions, each of the plurality of controllers a controller side connection portion common to the plurality of controllers and connectable to the power supply module side connection portion.

According to the above aspects, any one of the plurality of power supply modules can be combined with any one of the plurality of controllers. Therefore, one power supply module having a desired power supply performance is selected from the plurality of power supply modules, and one controller having a desired function is selected from the plurality of controllers, and a desired power supply device can be formed by combining the power supply module and the controller. Therefore, when the desired power supply device is provided, the plurality of power supply modules having conceivable power supply performances may be manufactured and prepared in advance, and the plurality of controllers having conceivable functions may be manufactured and prepared in advance. Compared with a case where the power supply device is redesigned for each use, the number of steps required to provide the power supply device can be prevented from increasing.

In the power supply device and the method for providing the power supply device, the power supply performances may be related to discharge voltages of the power supply modules.

According to the above device and method, the power supply module having a different discharge voltage as the power supply performance can be provided, and a desired discharge voltage can appropriately deal with a different need.

In the power supply device and the method for providing the power supply device, the power supply device may serve as an auxiliary power supply device provided on a power supply path between a main power supply and a power supply target of a power supply, and the functions may be to control charging and discharging of the power supply module, including a function of boosting a voltage of the main power supply through the charging and discharging of the power supply module and a function of backing up the power supply at a time of failure of the main power supply through the charging and discharging of the power supply module.

According to the above device and method, the controller having a different function of boosting the voltage of the main power supply or backing up the power supply when the main power supply fails as the function can be provided, and a desired function of boosting the voltage of the main power supply or backing up the power supply when the main power supply fails can appropriately deal with a different need.

In the power supply device and the method for providing the power supply device, the power supply device may include a combination of only one power supply module without combining the controller.

According to the above device and method, only the power supply module can be provided as the power supply device, which can appropriately deal with a need for only the power supply module.

According to the power supply device and the method for providing the power supply device according to one or more embodiments of the present invention, the number of steps required to provide the power supply device can be prevented from increasing.

DETAILED DESCRIPTION

One embodiment of a power supply device will be described with reference to the drawings.

A power supply device 1 according to the present embodiment is mounted on, for example, an electric power steering device of a vehicle. The electric power steering device assists steering operation of a driver by applying a rotational force of a motor as a steering assist force to a steering mechanism that steers steered wheels based on operation of a steering wheel of the driver. The power supply device 1 functions as an auxiliary power supply device that is provided on a power supply path between a main power supply and the motor serving as a power supply target of a power supply, thereby boosting a voltage of the main power supply or backing up the power supply the main power supply fails.

Figure 1A:
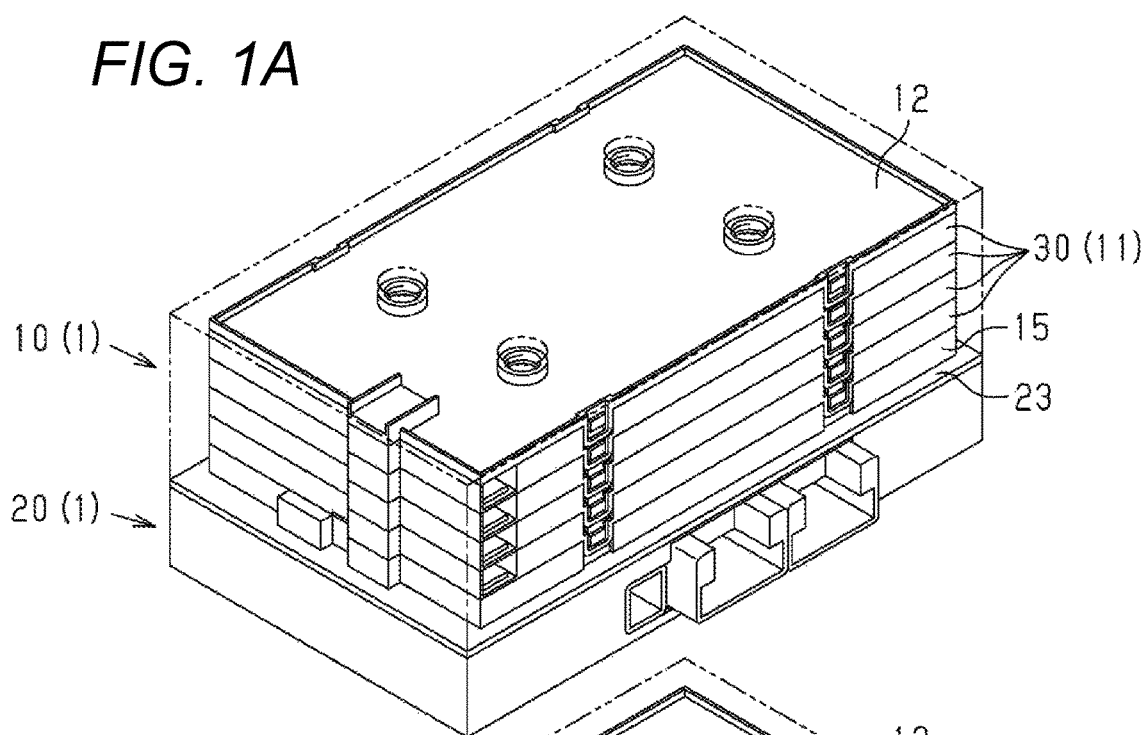
FIGS. 1A and 1B are schematic perspective views of a power supply device.
Figure 1B:
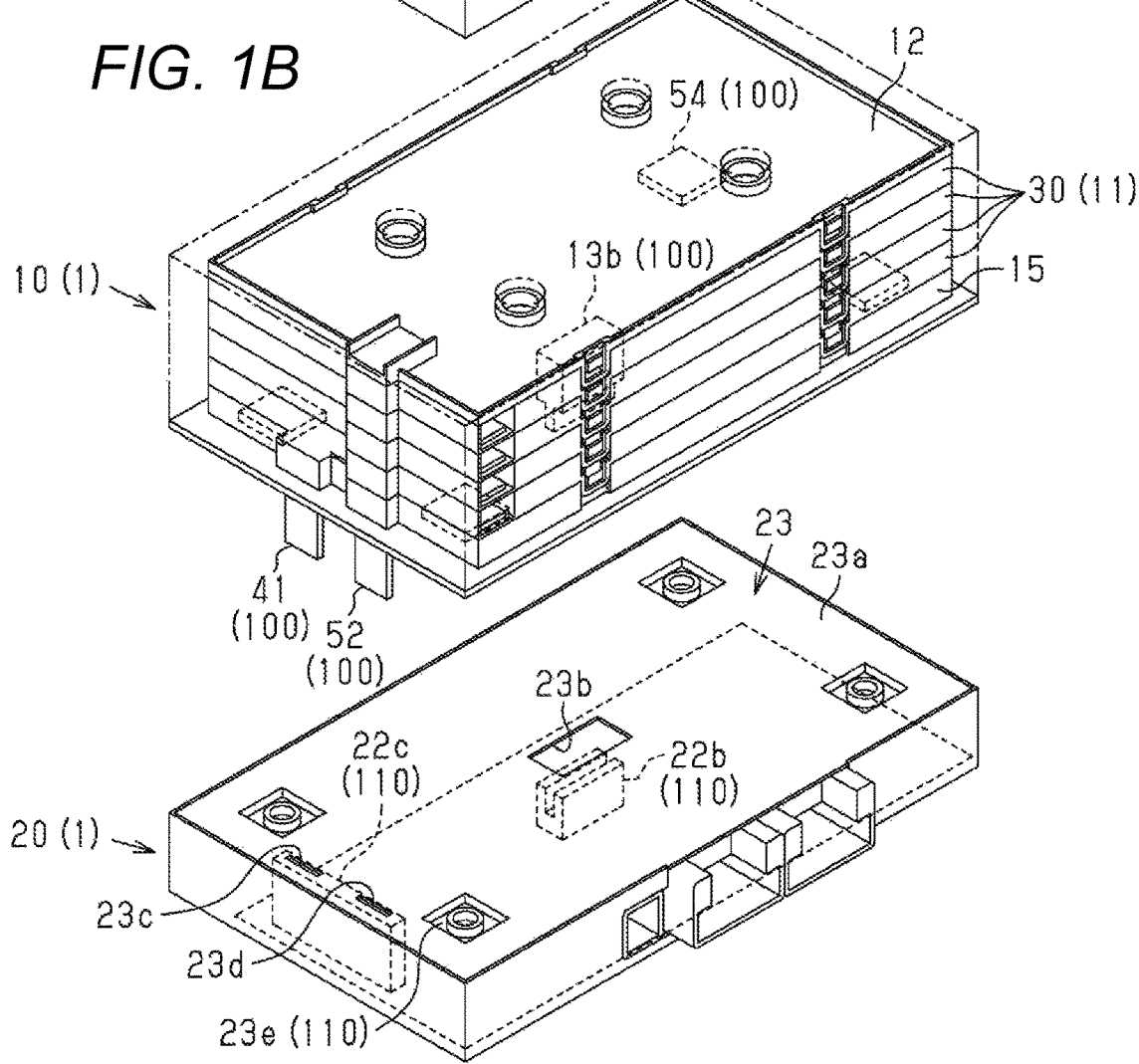

As shown in FIGS. 1A and 1B, the power supply device 1 has a substantially rectangular parallelepiped shape as a whole, and includes a power supply module 10 that can be charged and discharged, and a controller 20 that controls charging and discharging of the power supply module 10. The power supply device 1 is formed by combining the power supply module 10 and the controller 20 via a power supply module side connection portion 100 and a controller side connection portion 110, which will be described below.

Figure 2:
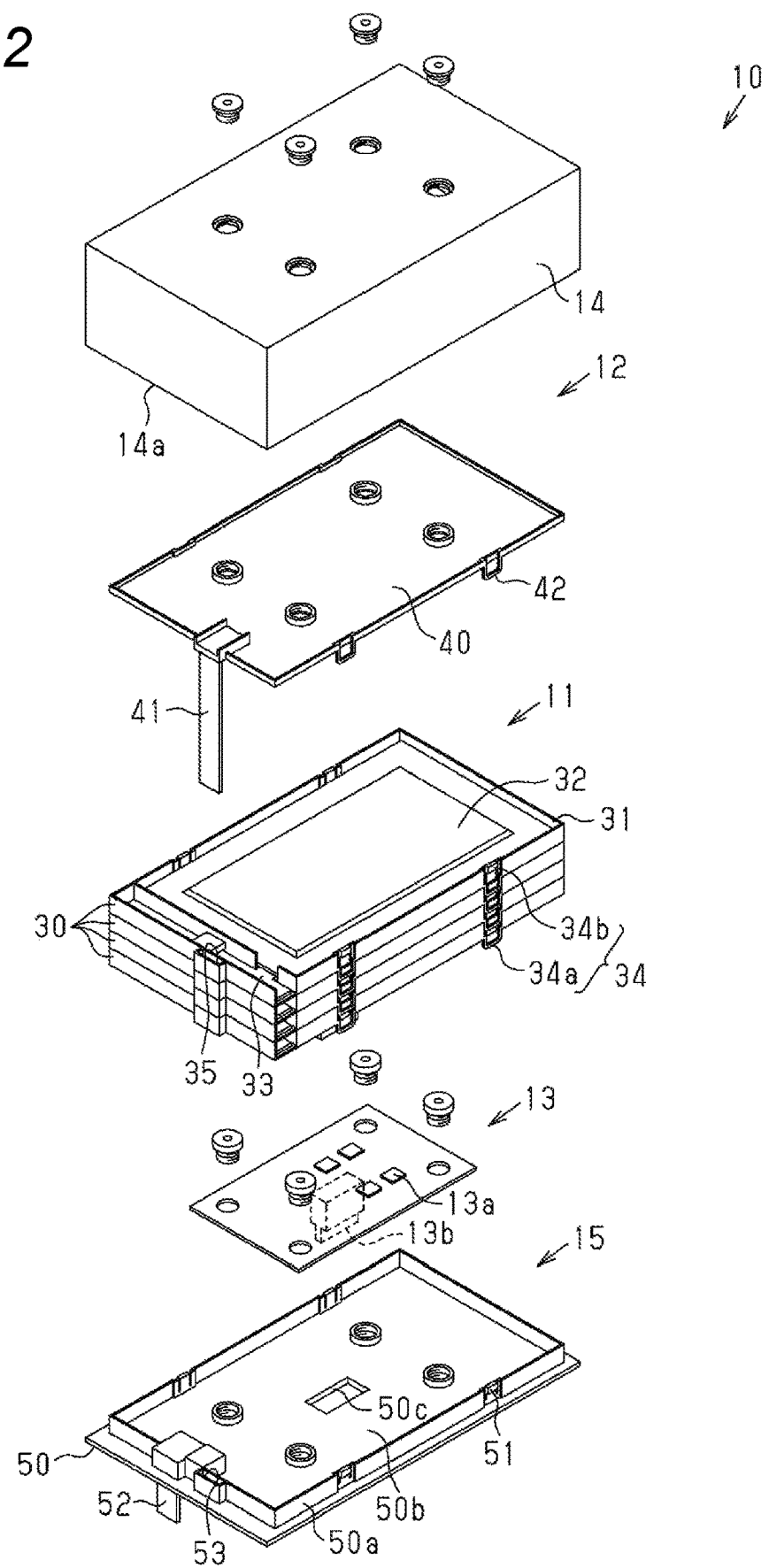
FIG. 2 is an exploded perspective view of a power supply module.

As shown in FIG. 2, the power supply module 10 includes a tray unit 11, a tray lid portion 12, a balance board 13, a cover 14 and a module bottom plate 15.

The tray unit 11 is formed by stacking a plurality of (four in FIG. 2) plate-shaped tray portions 30 in a plate thickness direction, and has a rectangular parallelepiped shape. The four tray portions 30 have the same configuration.

Figure 4:
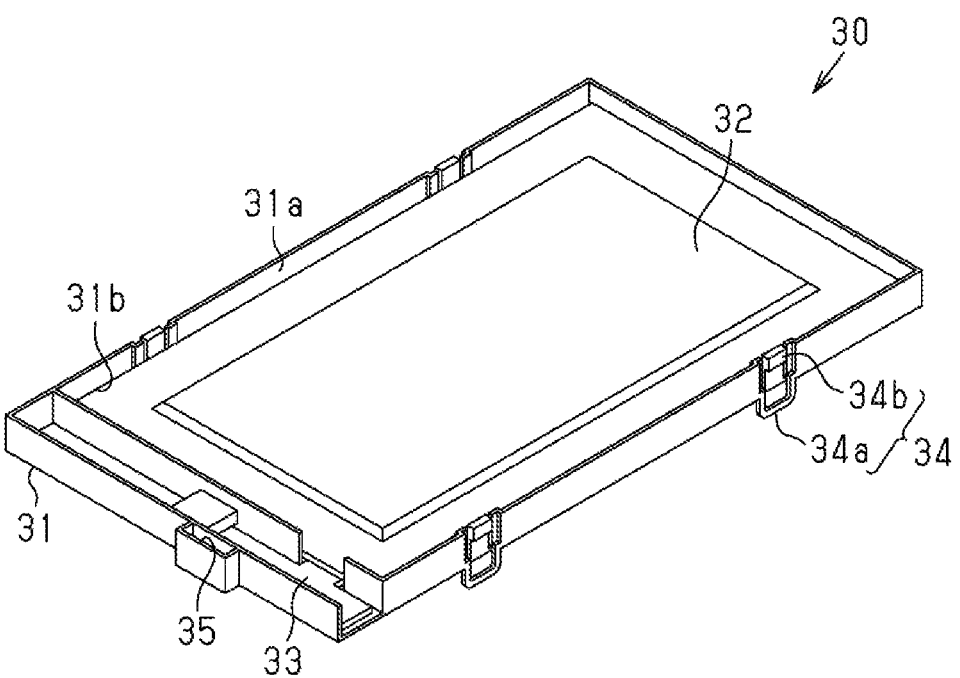
FIG. 4 is a schematic perspective view of a tray portion of the power supply module.

As shown in FIG. 4, the tray portion 30 has a rectangular plate-shaped tray base 31 having long sides and short sides. The tray base 31 is formed of a non-conductive material such as resin. A peripheral wall 31a extending on one side in the plate thickness direction is provided on a peripheral edge of the tray base 31. An accommodation portion 31b is formed in the tray base 31 by a surface of the tray base 31 where the peripheral wall 31a extends and inner wall surfaces of the peripheral wall 31a. The accommodation portion 31b accommodates a rectangular plate-shaped capacitor 32 having long sides and short sides, and a rectangular plate-shaped terminal portion 33 having long sides and short sides.

The capacitor 32 is accommodated such that side surfaces of the capacitor 32 of a pair of long sides and a side surface of the capacitor 32 of one short side orthogonal to the plate thickness direction are along the inner wall surfaces of the peripheral wall 31a of the pair of long sides and the inner wall surface of the peripheral wall 31a of one short side. The capacitor 32 has a positive electrode plate and a negative electrode plate. In the present embodiment, the capacitor 32 is a lithium ion capacitor. The lithium ion capacitor has high heat resistance, a long service life, a favorable charging and discharging performance, high energy density and high safety.

The terminal portion 33 is accommodated such that a side surface of the terminal portion 33 of one long side orthogonal to the plate thickness direction are along the inner wall surfaces of the peripheral wall 31a of the pair of long sides and the inner wall surface of the peripheral wall 31a of the other short side. The extending direction of the terminal portion 33 extends along the short side of the tray base 31. Both surfaces of the terminal portion 33 in the thickness direction are partially exposed from the thickness direction of the tray base 31. The positive electrode plate of the capacitor 32 is connected to one end surface of the terminal portion 33 in the plate thickness direction by welding or the like.

Two coupling portions 34 are provided on an outer wall surface of the peripheral wall 31a of each of the pair of long sides of the tray base 31. The coupling portion 34 includes an engaging portion 34a engageable with an engaged portion 34b provided on the coupling portion 34 of another tray portion 30, and an engaged portion 34b engageable with an engaging portion 34a provided on the coupling portion 34 of another tray portion 30. In addition, a bus bar hole 35 through which a first bus bar 41 described below is inserted is provided on an outer wall surface of the short side of the peripheral wall 31a on a side where the terminal portion 33 of the tray base 31 is provided so as to protrude outward.

The tray portions 30 configured as described above are stacked to a side where the capacitor 32 of one tray portion 30 is exposed from a side where the capacitor 32 of the other tray portion 30 is not exposed in the plate thickness direction. In this case, the engaging portion 34a of the other tray portion 30 is engaged with the engaged portion 34b of one tray portion 30, whereby one and the other tray portions 30 are assembled to each other. At the same time, the terminal portion 33 exposed in the plate thickness direction of one tray portion 30 and the terminal portion 33 exposed in the plate thickness direction of the other tray portion 30 are electrically connected by abutting each other via the capacitor 32, that is, the positive and negative electrode plates of the capacitor 32. Thereby, the capacitors 32 are electrically connected in series. In addition, the bus bar holes 35 are communicated with each other in the plate thickness direction between one tray portion 30 and the other tray portion 30. As in an example shown in FIG. 2, when four tray portions 30 are stacked in the plated thickness direction and four capacitors 32 are connected in series, a magnitude of a discharge voltage serving as a power supply performance of the tray unit 11 is a sum of discharge voltages of the four capacitors 32. For example, when a discharge voltage of one capacitor 32 is about 3V (volts), the magnitude of the discharge voltage of the tray unit 11 will be about 12V.

As shown in FIG. 2, the tray lid portion 12 is placed on the tray portion 30 in which the capacitor 32 is exposed in the tray unit 11, that is, the tray portion 30 stacked on the uppermost side when the plate thickness direction is an upper-lower direction. The tray lid portion 12 has a rectangular plate-shaped tray lid base 40 having long sides and short sides. The tray lid base 40 is formed of a non-conductive material such as resin.

Two engaging portions 42 are provided on a side surface of each of the pair of long sides of the tray lid base 40. The engaging portion 42 has a configuration the same as the engaging portion 34a of the coupling portion 34 of the tray portion 30, and is configured to be engageable with the engaged portion 34b provided in the tray portion 30. The first bus bar 41 is connected to a side surface of one short side of the tray lid base 40.

One end of the first bus bar 41 is connected to the tray lid base 40, and the other end thereof extends in the plate thickness direction. A length of the first bus bar 41 is set such that a tip end of the other end protrudes from the power supply module 10 in a stacking direction. The one end of the first bus bar 41 connected to the tray lid base 40 is exposed from the tray lid base 40 on a side where the first bus bar 41 extends toward the other end of the first bus bar 41.

The module bottom plate 15 is placed on the tray portion 30 in which the capacitor 32 is not exposed in the tray unit 11, that is, the tray portion 30 stacked on the lowermost side when the plate thickness direction is the upper-lower direction. The module bottom plate 15 has a rectangular plate-shaped housing base 50 having long sides and short sides. The housing base 50 is formed of a non-conductive material such as resin. A peripheral wall 50a extending on one side in the plate thickness direction is provided on a peripheral edge of the housing base 50. An accommodation portion 50b is formed in the housing base 50 by a surface of the housing base 50 where the peripheral wall 50a extends and inner wall surfaces of the peripheral wall 50a. A plate-shaped balance board 13 is fixed to the accommodation portion 50b by a fastening member such as a screw.

The balance board 13 is used to adjust the discharge voltage of each capacitor 32 of the tray unit 11 so as to suppress a variation in the discharge voltage. A control element 13a that functions to adjust the discharge voltage of each capacitor 32 is provided on one end surface of the balance board 13 in the plate thickness direction. In the present embodiment, the control element 13a controls the discharge voltage of each capacitor 32 to be the lowest discharge voltage of the capacitor 32 when adjusting the discharge voltage of each capacitor 32.

A power module side communication connection portion 13b for electrical communication between the control element 13a and the controller 20 is provided on the other end surface of the balance board 13 in the plate thickness direction. The balance board 13 is fixed such that the other end surface side in the plate thickness direction faces a housing base 50 side. The power module side communication connection portion 13b is configured to protrude from a surface opposite to a direction in which the peripheral wall 50a of the housing base 50 extends through a connection portion hole 50c provided in a center portion of the housing base 50.

Two engaged portions 51 are provided on an outer wall surface of the peripheral wall 50a of each of the pair of long sides of the housing base 50. The engaged portion 51 has a configuration the same as the engaged portion 34b of the coupling portion 34 of the tray portion 30, and is configured to be engageable with the engaging portion 34a provided in the tray portion 30. A second bus bar 52 is connected to a portion on one short side of the housing base 50.

One end of the second bus bar 52 is connected to the housing base 50, and the other end thereof extends in the plate thickness direction. A length of the second bus bar 52 is set such that a tip end of the other end protrudes from the power supply module 10 in the stacking direction. One end of the second bus bar 52 connected to the housing base 50 is exposed on a side opposite to a side where the other end of the second bus bar 52 of the housing base 50 extends. In addition, a bus bar hole 53 through which the first bus bar 41 is inserted in a state adjacent to the second bus bar 52 is provided at a portion on one short side of the housing base 50.

The tray lid portion 12 configured as described above is stacked on the tray portion 30 stacked on the uppermost side of the tray unit 11 from a side where the first bus bar 41 extends in the plate thickness direction. In this case, the engaging portion 42 of the tray lid portion 12 is engaged with the engaged portion 34b of the tray portion 30 stacked on the uppermost side, whereby the tray lid portion 12 and the tray portion 30 stacked on the uppermost side are assembled to each other. At the same time, one end of the first bus bar 41 exposed on the side where the other end of the first bus bar 41 extends and the terminal portion 33 exposed in the plate thickness direction of the tray portion 30 stacked on the uppermost side are electrically connected by abutting each other via the capacitor 32, that is, the positive and negative electrode plates of the capacitor 32. The first bus bar 41 of the tray lid portion 12 is inserted into the bus bar holes 35 communicated with each other between the tray portions 30 of the tray unit 11.

In addition, the module bottom plate 15 configured as described above is stacked below the tray portion 30 stacked on the lowermost side of the tray unit 11 from the side opposite to the side where the second bus bar 52 extends in the plate thickness direction. In this case, the engaging portion 34a of the tray portion 30 stacked on the lowermost side is engaged with the engaged portion 51 of the module bottom plate 15, whereby the module bottom plate 15 and the tray portion 30 stacked on the lowermost side are assembled to each other. At the same time, one end of the second bus bar 52 exposed on the side opposite to the side where the other end of the second bus bar 52 extends and the terminal portion 33 exposed in the plate thickness direction of the tray portion 30 stacked on the lowermost side are electrically connected by abutting each other. The bus bar hole 53 of the module bottom plate 15 is communicated with the bus bar holes 35 communicated with each other between the tray portions 30 of the tray unit 11 in the plate thickness direction. The first bus bar 41 of the tray lid portion 12 is inserted into the bus bar hole 53.

Figure 3:
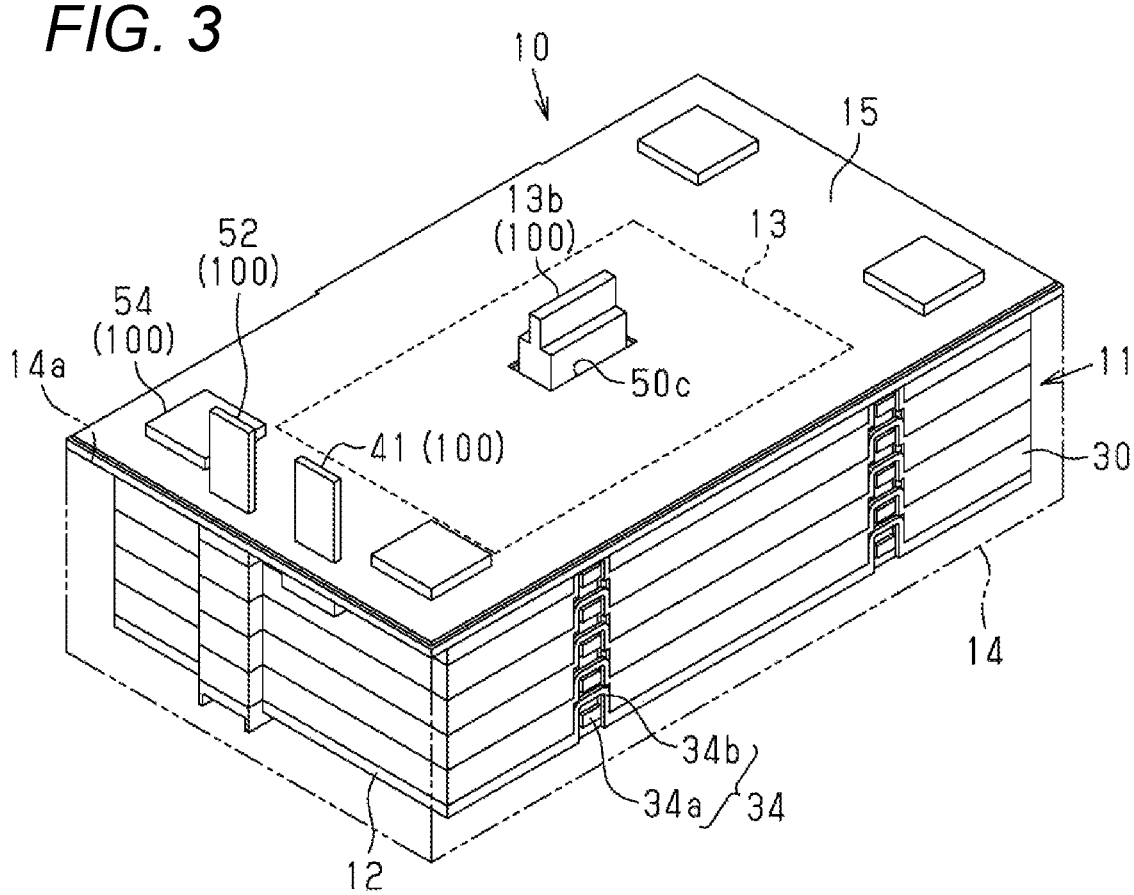
FIG. 3 is a schematic perspective view of the power supply module.

In this case, as shown in FIG. 3, from the side where the second bus bar 52 of the module bottom plate 15 extends, the tip end of the other end of the first bus bar 41 of the tray lid portion 12 and the tip end of the other end of the second bus bar 52 of the module bottom plate 15 protrude, and the power supply module side communication connection portion 13b of the balance board 13 protrudes. One protrusion 54 serving as a portion protruding from other portions is provided in each of four corners on a surface of the module bottom plate 15 on the side where the second bus bar 52 extends.

As shown in FIGS. 2 and 3, to a structure in which the tray unit 11, the tray lid portion 12, the balance board 13 and the module bottom plate 15 are assembled, a bottomed box-shaped cover 14 is assembled from an opening 14a side so as to accommodate the structure. The cover 14 is fixed to the side opposite to the side opposite to the side where the first bus bar 41 of the tray lid portion 12 extends by a fastening member such as a screw. Thereby, the power supply module 10 is formed.

Figure 5:
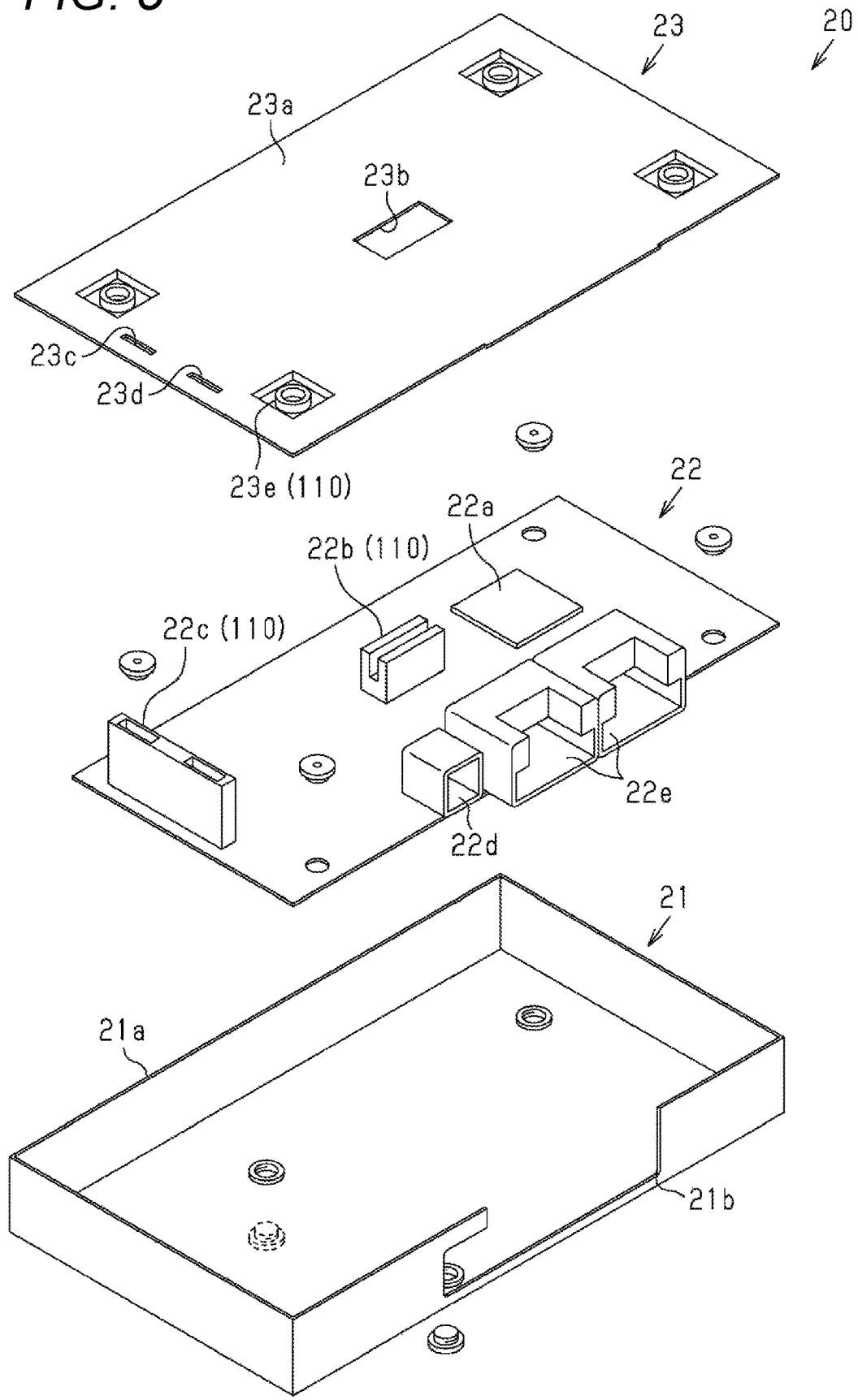
FIG. 5 is an exploded perspective view of a controller.

As shown in FIG. 5, the controller 20 includes a controller housing 21, a control board 22 and a controller lid portion 23.

The controller housing 21 has a bottomed box shape, and the plate-shaped control board 22 is fixed therein by a fastening member such as a screw. The control board 22 controls charging and discharging of each capacitor 32 of the tray unit 11. A control element 22a that functions to control charging and discharging of each capacitor 32 is provided on one end surface of the control board 22 in the plate thickness direction. In the example shown in FIG. 2, when controlling charging and discharging of each capacitor 32, the control element 22a performs control so as to boost the voltage of the main power supply and back up the power supply when the main power supply fails.

A controller side communication connection portion 22b for electrical communication between the control element 22a and the control element 13a of the power supply module 10 is provided on one end surface of the control board 22 in the plate thickness direction. The controller side communication connection portion 22b is provided at a position corresponding to the power module side communication connection portion 13b when the power supply module 10 and the controller 20 are assembled.

A controller side power supply connection portion 22c for electrical connection with the first bus bar 41 and the second bus bar 52 is provided on one end surface of the control board 22 in the plate thickness direction. The controller side power supply connection portion 22c is provided at a position corresponding to tip ends of the other end side of the first bus bar 41 and the second bus bar 52 when the power supply module 10 and the controller 20 are assembled.

An external communication connection portion 22d for electrical communication with an external device or the like (not shown) is provided on one end surface of the control board 22 in the plate thickness direction. The external communication connection portion 22d is provided on one end surface of the control board 22 so as to extend in a direction orthogonal to the plate thickness direction from one long side.

A power supply connection portion 22e for electrical connection with the main power supply (not shown) is provided on one end surface of the control board 22 in the plate thickness direction. The power supply connection portion 22e is provided on one end surface of the control board 22 so as to extend in a direction orthogonal to the plate thickness direction from one long side in a state adjacent to the external communication connection portion 22d.

The control board 22 is fixed such that a one end surface side thereof in the plate thickness direction faces an opening 21a side of the controller housing 21. In this case, the external communication connection portion 22d and the power supply connection portion 22e protrude from a side surface of a side wall of the controller housing 21 through a connection portion hole 21b provided in the side wall of one long side of the controller housing 21.

As shown in FIG. 5, the controller lid portion 23 has a rectangular plate-shaped controller lid base 23a having long sides and short sides. The controller lid base 23a is formed of a non-conductive material such as resin. A connection portion hole 23b penetrating in the plate thickness direction is provided at a center of the controller lid base 23a. The connection portion hole 23b is provided at a position corresponding to the controller side communication connection portion 22b. Bus bar holes 23c, 23d penetrating in the plate thickness direction are provided at portions on one short side of the controller lid base 23a. The bus bar holes 23c, 23d are provided at the positions corresponding to the controller side power supply connection portion 22c. One recess 23e serving as a portion recessed from other portions is provided in each of the four corners on one end surface of the controller lid portion 23 in the plate thickness direction. Each recess 23e is provided at a position corresponding to each protrusion 54 of the module bottom plate 15 when the power supply module 10 and the controller 20 are assembled.

The controller lid portion 23 configured as described above is assembled to the opening 21a side of the controller housing 21 so as to accommodate a structure in which the controller housing 21 and the control board 22 are assembled from a the other end surface side opposite to a side where the recesses 23e are provided, in the plate thickness direction. The controller lid portion 23 is fixed to the controller housing 21 by a fastening member such as a screw. Thereby, the controller 20 is formed.

As shown in FIGS. 1A and 1B, the power supply module 10 and the controller 20 are assembled in a state in which a module bottom plate 15 side of the power supply module 10 and a controller lid portion 23 side of the controller 20 face each other.

In this case, as shown in FIGS. 3 and 5, the power module side communication connection portion 13b protruding from the module bottom plate 15 side of the power supply module 10 is fitted and electrically connected to the controller side communication connection portion 22b of the control board 22 through the connection portion hole 23b provided in the controller lid portion 23. The first bus bar 41 and the second bus bar 52 protruding from the module bottom plate 15 side of the power supply module 10 are fitted and electrically connected to the controller side power supply connection portion 22c of the control board 22 through the bus bar holes 23c, 23d provided in the controller lid portion 23. The protrusions 54 protruding from the module bottom plate 15 side of the power supply module 10 and the recesses 23e of the controller lid portion 23 are unevenly fitted to each other. Thereby, the power supply device 1 is formed.

The above description has described the power supply device 1 having a power supply performance in which the four capacitors 32 are connected in series and a function of boosting the voltage of the main power supply and backing up the power supply when the main power supply fails.

In the power supply device 1 according to the present embodiment, in addition to the example shown in FIG. 2, the power supply module 10 having different power supply performances can be formed by adopting the tray unit 11 in which the number of the tray portions 30, that is, the capacitors 32 is changed.

Figure 6:
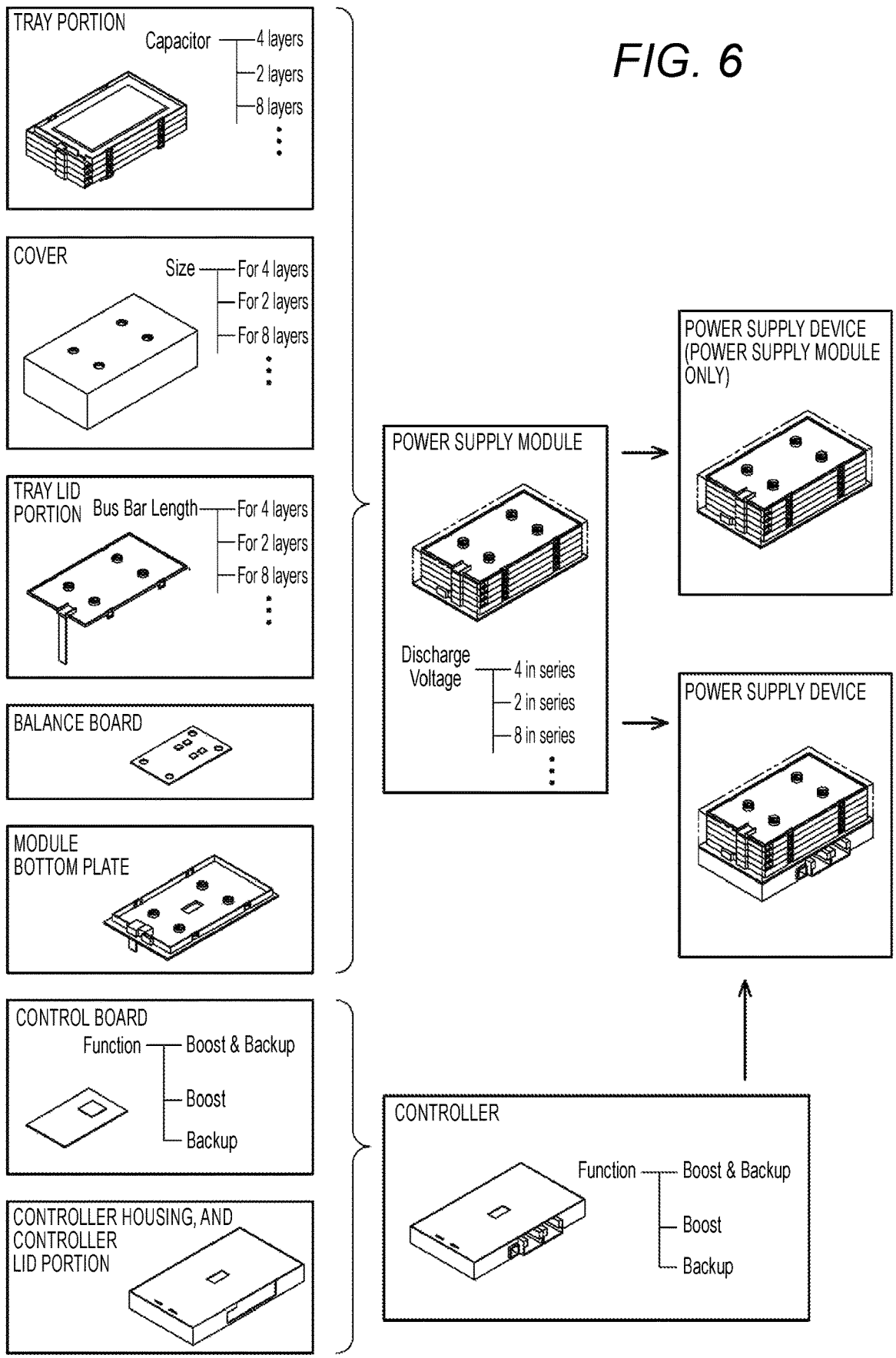
FIG. 6 is a view schematically showing a combination of the power supply module and the controller.

For example, as shown in FIG. 6, by adopting the tray unit 11 in which the number of the capacitors 32 is changed to two, the power supply module 10 having a power supply performance in which the magnitude of the discharge voltage is about 6V when the discharge voltage of one capacitor 32 is about 3V can be formed. By adopting the tray unit 11 in which the number of the capacitors 32 is changed to eight, the power supply module 10 having a power supply performance in which the magnitude of the discharge voltage is about 24V when the discharge voltage of one capacitor 32 is about 3V can be formed. In addition, many variations of the power supply module 10 having three, five and the like capacitors 32 can be considered.

In this way, in many variations of the power supply module 10, the number of the tray portions 30 is changed to a desired number, and the length of the first bus bar 41 of the tray lid portion 12 is changed such that the tip end of the other end protrudes from the power supply module 10 in the stacking direction, and the number of the control elements 13a of the balance board 13 is changed according to the number of the tray portions 30. In many variations of the power supply module 10, a size of the cover 14 is changed such that the tray unit 11 in which the number of the tray portions 30 is changed can be accommodated. On the other hand, in many variations of the power module 10, the same configurations of the power module side communication connection portion 13b of the balance board 13 and the module bottom plate 15 are used. That is, in many variations of the power module 10, configurations are made common, in which the tip end of the other end of the first bus bar 41 of the tray lid portion 12, the tip end of the other end of the second bus bar 52 of the module bottom plate 15, the power supply module side communication connection portion 13b of the balance board 13 and the protrusions 54 of the module bottom plate 15, all protrude from the side where the second bus bar 52 of the module bottom plate 15 extends. The common configurations in these power supply modules 10, that is, the first bus bar 41 of the tray lid portion 12, the second bus bar 52 of the module bottom plate 15, the power supply module side communication connection portion 13b of the balance board 13 and the protrusions 54 of the module bottom plate 15, correspond to the common power supply module side connection portion 100 (see FIG. 1B and the like).

In addition to the example shown in FIG. 2, in the power supply device 1 according to the present embodiment, the controller 20 having a different function can be formed by adopting the control board 22 in which a function of the control element 22a is changed.

For example, as shown in FIG. 6, many variations of the controller 20, in which the function of the control element 22a is changed to only boost the voltage of the main power supply or to only back up the power supply when the main power supply fails, can be considered.

In this way, in many variations of the controller 20, a processing program stored in a ROM (not shown) of the control board 22 is changed to a processing program having a desired function. On the other hand, in many variations of the controller 20, the same configurations of the controller side communication connection portion 22b, the controller side power supply connection portion 22c, the external communication connection portion 22d, the power supply connection portion 22e, the controller housing 21 and the controller lid portion 23 are used. That is, configurations are made common, in which the power supply module side communication connection portion 13b of the power supply module 10 can be fitted to the controller side communication connection portion 22b of the control board 22, the first bus bar 41 and the second bus bar 52 of the power supply module 10 can be fitted to the controller side power connection portion 22c of the control board 22, and the protrusions 54 can be respectively fitted to the recesses 23e. The common configurations in these controllers 20, that is, the controller side communication connection portion 22b of the control board 22, the controller side power supply connection portion 22c of the control board 22, and the recesses 23e of the controller lid portion 23, correspond to the common controller side connection portion 110 (see FIG. 1B and the like).

That is, as shown in FIG. 6, in the present embodiment, any one of many conceivable variations of the power supply module 10 can be combined with many conceivable variations of the controller 20. Therefore, one power supply module 10 having a desired power supply performance is selected from many conceivable variations of the power supply module 10, and one controller 20 having a desired function is selected from many conceivable variations of the controller 20, and a desired power supply device 1 can be formed by combining the power supply module 10 and the controller 20. In the present embodiment, the power supply device 1 having a combination of only the power supply module 10 can be configured without combining the controller 20 with the power supply module 10.

A method for providing the power supply device 1 according to the present embodiment will be described in detail below.

In the present embodiment, many conceivable variations of the power supply module 10 as described above are manufactured and prepared in advance, and many conceivable variations of the controller 20 as described above are manufactured and prepared in advance. In this state, the power supply device 1 is provided according to the following flow.

Figure 7:
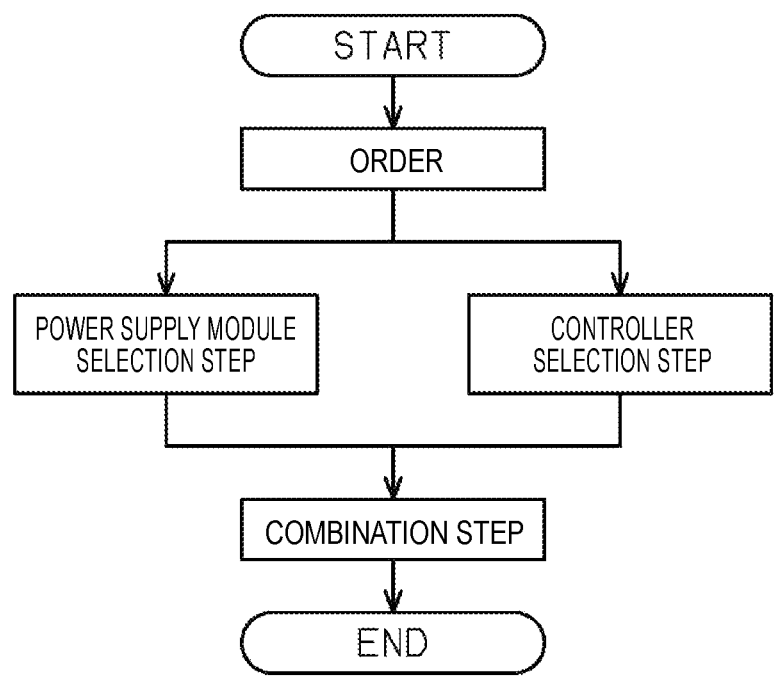
FIG. 7 is a diagram schematically showing a method for providing a power supply device.

Specifically, as shown in FIG. 7, when an order indicating requirements such as the power supply performance of the power supply module 10 and the function of the controller 20 is received from a customer, a power supply module selection step and a controller selection step are respectively performed in order to select a desired power supply module 10 and a desired controller 20 according to the requirements.

In the power supply module selection step, the power supply module 10 configured to have the power supply performance according to the requirement of the received order is selected from many variations of the power supply module 10 manufactured and prepared in advance.

In the controller selection step, the controller 20 having the function according to the requirement of the received order is selected from many variations of the controller 20 manufactured and prepared in advance. In the controller selection step, if a requirement that does not require a controller is indicated as the requirement of the received order, no controller 20 is selected.

After performing the power supply module selection step and the controller selection step, a combination step of combining the power supply module 10 and the controller 20 selected in the selection steps is performed, and the power supply device 1 is provided by performing the combination step. When the controller 20 is not selected in the controller selection step, the power supply module 10 selected in the power supply module selection step is provided as the power supply device 1. In this case, the combination step is omitted.

The operation and effects of the present embodiment will be described.

(1) According to the present embodiment, any one of many conceivable variations of the power supply module 10 can be combined with any one of many conceivable variations of the controller 20. Therefore, one power supply module 10 having a desired power supply performance is selected from many conceivable variations of the power supply module 10, and one controller 20 having a desired function is selected from many conceivable variations of the controller 20, and a desired power supply device 1 can be formed by combining the power supply module 10 and the controller 20. Therefore, when the desired power supply device 1 is provided, the plurality of power supply modules 10 having different power supply performances may be manufactured and prepared in advance, and the plurality of controllers 20 having different functions may be manufactured and prepared in advance. Compared with a case where the power supply device 1 is redesigned for each use, the number of steps required to provide the power supply device 1 can be prevented from increasing.

(2) The power supply module 10 having a different discharge voltage as the power supply performance can be provided, and a desired discharge voltage can appropriately deal with a different need.

(3) The controller 20 having a different function of boosting the voltage of the main power supply or backing up the power supply when the main power supply fails as the function can be provided, and a desired function of boosting the voltage of the main power supply or backing up the power supply when the main power supply fails can appropriately deal with a different need.

(4) According to the present embodiment, only the power supply module 10 can be provided as the power supply device 1, which can appropriately deal with a need for only the power supply module 10.

(5) When use of the power supply device 1 in a current use ends, the combination of the power supply module 10 and the controller 20 is released, and the power supply module 10 can be reused in a next use. Since the power supply module side connection portion 100 and the controller side connection portion 110 are common, the power supply module 10 can be combined with the controller 20 having a desired function in the next use. During reuse, the tray portion 30 can be reused individually by releasing engagement between the engaged portion 34b and the engaging portion 34a. In particular, since a lithium ion capacitor is adopted as the capacitor 32, whose lifetime is long, there may be many opportunities for reuse. Therefore, a need to reuse the power supply device 1 can be appropriately dealt with. In addition, the tray portion 30 can be individually detached from the tray unit 11, which can appropriately deal with repair or replacement of the tray portion 30 in units.

(6) In the present embodiment, since the capacitor 32 is formed in a rectangular plate shape, waste of space when the power supply device 1 is mounted can be reduced as compared with a case where an electric double-layer capacitor generally having a cylindrical shape is used.

The present embodiment may be modified as follows. In addition, the following other embodiments can be combined with each other as long as there is no technical contradiction. Many conceivable variations of the power supply module 10 may be prepared in advance, and these may be arranged in a store or the like. Therefore, the method for providing the power supply module 10 may be adopted to allow the customer to select a desired power supply module 10 from many prepared variations of the power supply module 10. Many conceivable variations of the controller 20 may be prepared in advance, and these may be arranged in a store or the like to allow the customer to select a desired controller 20 from many prepared variations of the controller 20. Even when such a providing method is adopted, effects the same as those of the above embodiment can be obtained.

When the use of the power supply device 1 in the current use is completed, the combination of the power supply module 10 and the controller 20 is released, and the controller 20 may be reused in the next use.

The function of the controller 20 may be a communication function of communicating information such as a charging state of the power supply module 10 with the external device. The function of the controller 20 may be presence or absence of the communication function with the external device. In this case, the control board 22 may change presence or absence of the external communication connection portion 22d. That is, at least the power supply module side connection portion 100 and the controller side connection portion 110 may be common, and the external communication connection portion 22d and the power supply connection portion 22e may not be common in the control board 22. That is, as a variation of the function of the controller 20, the external communication connection portion 22d and the power supply connection portion 22e may be prepared to have different configurations.

The power supply performance of the power supply module 10 may include a capacitor capacity of the power supply module 10, or may include a current amount of the power supply module 10.

The power supply module 10 may be used as the main power supply. In this case, the function of the controller 20 includes a function of operating the power supply module 10 as the main power supply.

The overall shape of the power supply device 1 is not limited to the rectangular parallelepiped shape, and may be, for example, a cylindrical shape.

In the power supply module 10, an electric double-layer capacitor (EDLC), a lithium ion battery, a lead storage battery or the like may be used as a power supply instead of the capacitor 32. Even in these cases, effects the same as those of the above embodiment can be obtained.

The power supply device 1 may be applied to an uninterruptible power supply device, may be mounted on an automated guided vehicle, may be mounted on a transmission line, or may be mounted on an industrial machine.

The invention claimed is:

1. A power supply device comprising:
   a combination of one power supply module of a plurality of power supply modules having different power supply performances and one controller of a plurality of controllers having different functions, which are selectively combined, wherein
   each of the plurality of power supply modules comprises
      a bottom plate, and
      a power supply module side connection portion common to the plurality of power supply modules, the power supply module side connection portion including a power supply module side communication connection portion that protrudes through an opening in the bottom plate, and
   each of the plurality of controllers comprises
      a lid, and
      a controller side connection portion common to the plurality of controllers and connectable to the power supply module side connection portion, to allow the one power supply module and the one controller to be selectively combined, the controller side connection portion including a controller side communication connection portion that protrudes through an opening in the lid, the controller side communication connection portion being fitted to and electrically connected to the power supply module side communication connection portion in the combination.

2. The power supply device according to claim 1, wherein the power supply performances are related to discharge voltages of the power supply modules.

3. The power supply device according to claim 1, wherein the power supply device serves as an auxiliary power supply device provided on a power supply path between a main power supply and a power supply target of a power supply, and
   wherein the functions are to control charging and discharging of the power supply module, including a function of boosting a voltage of the main power supply through the charging and discharging of the power supply module and a function of backing up the power supply at a time of failure of the main power supply through the charging and discharging of the power supply module.

4. A method for providing a power supply device comprising a combination of one power supply module of a plurality of power supply modules having different power supply performances and one controller of a plurality of controllers having different functions, which are selectively combined, the method for providing the power supply device comprising:
- a power supply module selection process in which the one power supply module is selected from the plurality of power supply modules having the different power supply performances, each of the plurality of power supply modules comprising
  - a bottom plate, and
  - a power supply module side connection portion common to the plurality of power supply modules, the power supply module side connection portion including a power supply module side communication connection portion that protrudes through an opening in the bottom plate; and
- a controller selection process in which the one controller is selected from the plurality of controllers having different functions, each of the plurality of controllers comprising
  - a lid, and
  - a controller side connection portion common to the plurality of controllers and connectable to the power supply module side connection portion, the controller side connection portion including a controller side communication connection portion that protrudes through an opening in the lid, the controller side communication connection portion being fitted to and electrically connected to the power supply module side communication connection portion in the combination.

5. The method for providing the power supply device according to claim 4,
wherein the power supply performances of the power supply modules to be selected in the power supply module selection process are related to discharge voltages of the power supply modules.

6. The method for providing the power supply device according to claim 4,
wherein the power supply device serves as an auxiliary power supply device provided on a power supply path between a main power supply and a power supply target of a power supply, and
wherein the functions of the controllers to be selected in the controller selection process are to control charging and discharging of the power supply module, including a function of boosting a voltage of the main power supply through the charging and discharging of the power supply module and a function of backing up the power supply at a time of failure of the main power supply through the charging and discharging of the power supply module.

\* \* \* \* \*